(12) United States Patent
Wiscombe et al.

(10) Patent No.: US 10,384,634 B2
(45) Date of Patent: Aug. 20, 2019

(54) SIDE AIRBAG WITH ACCORDION PELVIS FOLD

(71) Applicant: AUTOLIV ASP, INC., Ogden, UT (US)

(72) Inventors: Derek John Wiscombe, Morgan, UT (US); Charles Paul Dinsdale, Farr West, UT (US); Don Larry Parker, Syracuse, UT (US); Terry Alan Wheelwright, Morgan, UT (US); Andrew Lawrence Holiday, Pleasant View, UT (US); Christine Elizabeth Devey, Wellsville, UT (US)

(73) Assignee: AUTOLIV ASP, INC., Ogden, UT (US)

( * ) Notice: Subject to any disclaimer, the term of this patent is extended or adjusted under 35 U.S.C. 154(b) by 129 days.

(21) Appl. No.: 15/832,128

(22) Filed: Dec. 5, 2017

(65) Prior Publication Data
US 2019/0168704 A1    Jun. 6, 2019

(51) Int. Cl.
*B60R 21/217* (2011.01)
*B60R 21/237* (2006.01)
*B60R 21/00* (2006.01)
*B60R 21/231* (2011.01)

(52) U.S. Cl.
CPC ........ *B60R 21/2176* (2013.01); *B60R 21/237* (2013.01); *B60R 2021/0055* (2013.01); *B60R 2021/23146* (2013.01)

(58) Field of Classification Search
CPC .............. B60R 21/2176; B60R 21/237; B60R 2021/0055; B60R 2021/23146
See application file for complete search history.

(56) References Cited

U.S. PATENT DOCUMENTS

| 5,178,407 | A | * | 1/1993 | Kelley | B60R 21/231 |
| | | | | | 280/728.1 |
| 5,765,863 | A | * | 6/1998 | Storey | B60R 21/207 |
| | | | | | 280/729 |
| 5,803,483 | A | | 9/1998 | Lunt | |
| 5,931,498 | A | * | 8/1999 | Keshavaraj | B60R 21/231 |
| | | | | | 280/743.1 |
| 5,944,346 | A | | 8/1999 | Lachat et al. | |
| 6,739,622 | B2 | * | 5/2004 | Halford | B60R 21/237 |
| | | | | | 280/743.1 |
| 8,540,276 | B2 | | 9/2013 | Schneider et al. | |
| 9,573,551 | B1 | | 2/2017 | Wang et al. | |

(Continued)

OTHER PUBLICATIONS

U.S. Patent Office, English language version of the International Search Report, Form PCT/ISA/210 for International Application PCT/US2018/057047, Feb. 14, 2019 (4 pages).

(Continued)

*Primary Examiner* — Darlene P Condra
(74) *Attorney, Agent, or Firm* — Pauley Erickson & Kottis

(57) ABSTRACT

Side airbag cushions, side airbag assemblies and related methods for stowing a side airbag cushion in a cover to provide, upon deployment, improved timing of pelvis coverage for an associated vehicle passenger are provided. The side airbag cushion desirably includes a first rolled portion and a second accordion folded portion and, wherein, upon deployment, the accordion folded portion provides improved timing allowing for better pelvis coverage for the associated vehicle passenger.

18 Claims, 13 Drawing Sheets

(56) References Cited

U.S. PATENT DOCUMENTS

| | | | |
|---|---|---|---|
| 2006/0255572 A1* | 11/2006 | Svenbrandt | B60R 21/207 |
| | | | 280/730.2 |
| 2009/0206585 A1 | 8/2009 | Honda | |
| 2010/0001500 A1* | 1/2010 | Feller | B60R 21/237 |
| | | | 280/743.1 |
| 2013/0113190 A1 | 5/2013 | Schneider et al. | |
| 2017/0043740 A1* | 2/2017 | Schneider | B60R 21/231 |
| 2019/0039556 A1* | 2/2019 | Jindal | B60R 21/237 |

OTHER PUBLICATIONS

U.S. Patent Office, English language version of the Written Opinion of the International Searching Authority, Form PCT/ISA/237 for International Application PCT/US2018/057047, Feb. 14, 2019 (5 pages).

* cited by examiner

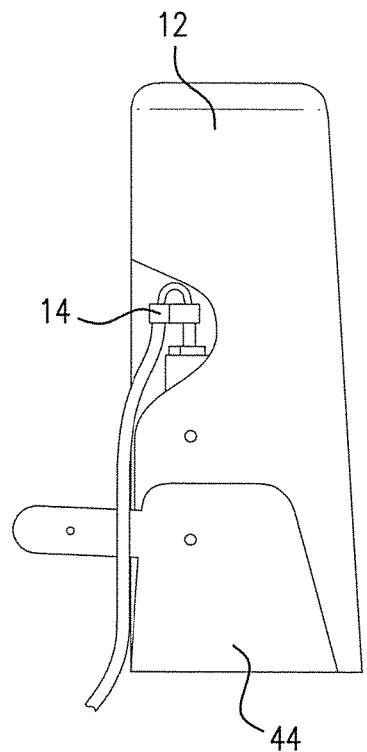
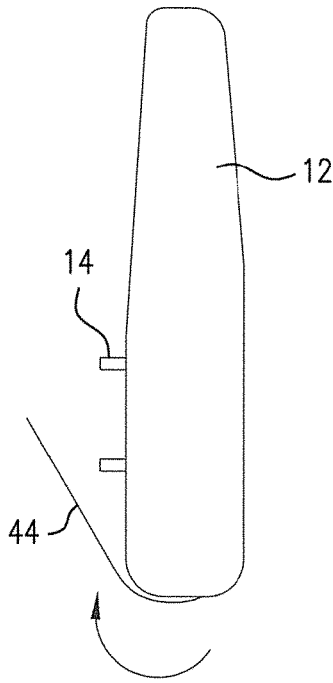
FIG.23  FIG.24
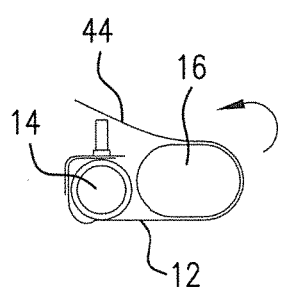
FIG.25

SIDE AIRBAG WITH ACCORDION PELVIS FOLD

BACKGROUND

Field

This invention relates generally to automotive safety devices and systems and, more particularly, to airbag cushions which are inflatable to restrain the movement of a vehicle occupant such as particularly suited in or for the protection of a seated vehicle occupant in the event or occurrence of a side impact or collision and methods for folding or stowing such an airbag cushion.

Discussion of Related Art

The use of side airbag cushions is widespread in present day automotive technology. Typically, a side airbag cushion is stored or located in an inner side structure or in a backrest of a seat of a vehicle and, in the event of an impact or collision helps to protect an occupant, including the thorax, abdomen and pelvic regions of an occupant, during a side impact or collision.

New side impact crashworthiness requirements and the anthropomorphic test devices (ATD), sometimes more commonly referred to as "crash test dummies", used in evaluating satisfaction of the crashworthiness requirements, can act to reduce the dimensions of the gap or space between the test device (particularly in the vicinity of the pelvic area or region) and the door liner. For example, the inflatable airbag cushion may have less time to expand into the volume between the pelvis and door liner due to the wider pelvis anew test devices.

The satisfaction of increasingly stringent performance criteria for vehicle side impact safety restraints while simultaneously providing thin and sleek safety restraint assembly or module designs such as typically desired by automobile manufacturers and designers presents ongoing challenges to those in the industry.

SUMMARY

A general object of the subject development is to provide one or more of an improved side airbag assembly, inflatable folded side airbag cushion and/or method for stowing a side airbag cushion in a cover such as to provide, upon deployment, improved timing of pelvis coverage for an associated vehicle passenger.

A more specific objective of the subject development is to overcome one or more of the problems described above.

In accordance with one aspect of the subject development there is provided an inflatable folded side airbag cushion for providing improved timing of pelvis coverage for an associated vehicle passenger. The inflatable folded side airbag cushion includes a first rolled portion and a second accordion folded portion. Upon deployment of the so folded side airbag cushion, the accordion folded portion serves to provide improved desired pelvis coverage for the associated vehicle passenger.

In accordance with another aspect of the subject development there is provided a side airbag assembly. In one embodiment, the side airbag assembly includes a cover having or including a wall that defines at least a portion of a cavity. The side airbag assembly further includes an inflator device at least in part disposed within the cover cavity. The inflator device, upon actuation, acts or serves to provide inflation gas. The assembly further includes a side airbag cushion. The side airbag cushion is in inflation gas flow communication with the inflator device upon actuation of the inflator device. The side airbag cushion is at least in part disposed within the cover cavity in a stowed configuration. The side airbag in the stowed configuration includes a first rolled main portion and a second accordion folded distal portion. The stowed configuration is such that, upon deployment, inflation gas into or in the airbag cushion must sequentially flow through the cushion main portion prior to passage into the cushion distal portion.

In another aspect of the subject development, in a side airbag assembly including wherein an inflator device, upon actuation, provides inflation gas to inflate an associated side airbag cushion, there is provided a method for stowing the side airbag cushion in a cover to provide, upon deployment, improved timing of pelvis coverage for an associated vehicle passenger. In one embodiment, such a method involves coupling the inflator device with the cover and coupling the inflator device with the side airbag cushion in inflation gas flow communication via an inlet opening in a proximal main portion of the side airbag cushion. The side airbag cushion includes a distal portion extending from the proximal main portion. The proximal main portion of the side airbag cushion is rolled to form a first rolled main portion. The distal portion of the side airbag cushion is folded to form a second accordion folded distal portion. Further, upon deployment, inflation gas into or in the side airbag cushion must sequentially flow through the proximal main portion of the side airbag cushion prior to passage into the accordion folded distal portion.

Other objects and advantages will be apparent to those skilled in the art from the following detailed description taken in conjunction with the appended claims and drawings.

BRIEF DESCRIPTION OF THE DRAWINGS

FIG. 23 is a top view of a partially assembled side airbag assembly, in accordance with one embodiment of the subject development.

FIG. 24 is a side view of the cover, inflator device and side airbag cushion combination shown in FIG. 23 and further illustrating the closing of the closure flap of the cover.

FIG. 25 is a sectional view of the cover, inflator device and side airbag cushion combination shown in FIGS. 23 and 24.

DETAILED DESCRIPTION

Example embodiments will now be described more fully with reference to the accompanying drawings. As will be appreciated, certain standard elements not necessary for an understanding of the subject development may have been omitted or removed from the drawings for purposes of facilitating illustration and comprehension.

In the following description, numerous specific details are set forth such as examples of specific components, devices, and methods, to provide a thorough understanding of embodiments of the present disclosure. It will be apparent to those skilled in the art that specific details need not be employed, that the example embodiments should not be construed to limit the scope of the present disclosure. Furthermore, well-known processes, well-known device structures, and well-known technologies are not described herein in detail.

Figure 1:
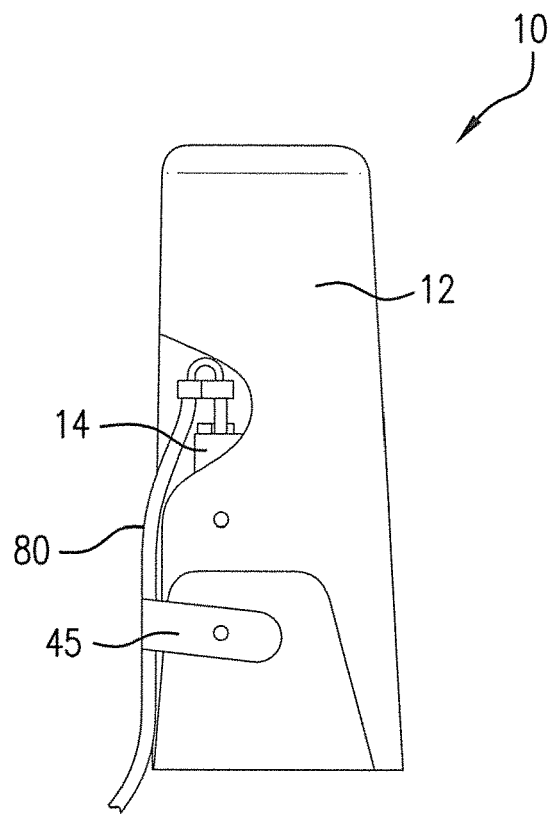
FIG. 1 is a top view of a side airbag assembly in accordance with one embodiment of the present development.
Figure 2:
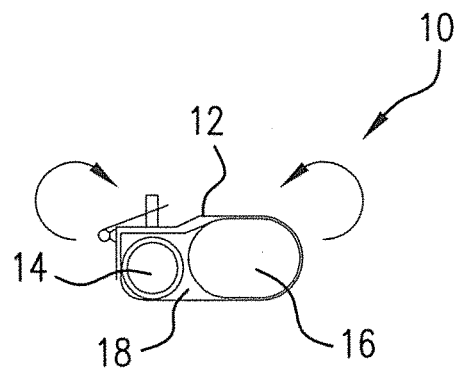
FIG. 2 is a simplified side sectional view of the side airbag assembly shown in FIG. 1.

With reference now to the drawings, wherein like reference characters designate like or corresponding parts throughout the several views, there is shown in FIGS. 1 and 2 a side airbag assembly, generally designated by the reference numeral 10, in accordance with one embodiment of the present development.

While the subject development will be described hereinafter with particular reference to a preferred embodiment such as includes a side airbag cushion and associated airbag inflatable restraint system installations, those skilled in the art and guided by the teachings herein provided will understand and appreciate that the broader practice of the invention is not necessarily so limited as the invention can have general applicability to other types or kinds of airbag assemblies including, for example, knee airbags, driver, and passenger front airbags, as may be desired and such as may find application in various restraint assemblies such as for automotive vehicles including vans, pick-up trucks, and particularly automobiles.

As detailed below, the side airbag assembly 10 includes a cover or wrap 12, an inflator device 14, and a side airbag cushion 16, with the side airbag cushion 16 folded and otherwise stowed in a manner that upon deployment results, provides or produces improved pelvis coverage timing for an associated vehicle passenger such in the event of a high speed impact. Furthermore, such folding and/or stowing of the side airbag cushion 16 and associated side airbag assembly components, such as herein described, desirably forms a package that is particularly suited for appropriate incorporation in a motor vehicle. To that end, the cover or wrap may be desirably constructed or shaped to form a contained volume 18 or, as sometimes referred to herein a "cavity" or "pocket" such as to contain or hold the inflator device 14 and the folded and stowed airbag cushion 16.

The inflator device 14, such as known in the art, serves upon actuation to provide inflation gas such as used or employed to inflate the airbag cushion. Those skilled in the art and guided by the teachings herein provided with understand and appreciate that the inflator device and airbag cushion are appropriately disposed within the assembly in inflation gas flow communication. For example, the inflator device maybe stored or contained within the airbag cushion such that inflation gas discharged or released from the inflator device is discharged or released directly into the airbag cushion to result in the inflation of the airbag cushion. The broader practice of the invention is not necessarily so limited. For example, a fabric diffuser or the like maybe disposed between the inflator device and the airbag cushion. In other embodiments, the airbag cushion material may include sew lines disposed between the portion of the inflator device from which inflation gas is discharged or released and airbag cushion section or compartment to be inflated.

The folding of the airbag cushion 16 and the packaging of the side airbag assembly 10 for being appropriately stowed in a vehicle will now be described making reference to particular figures.

Figure 3:
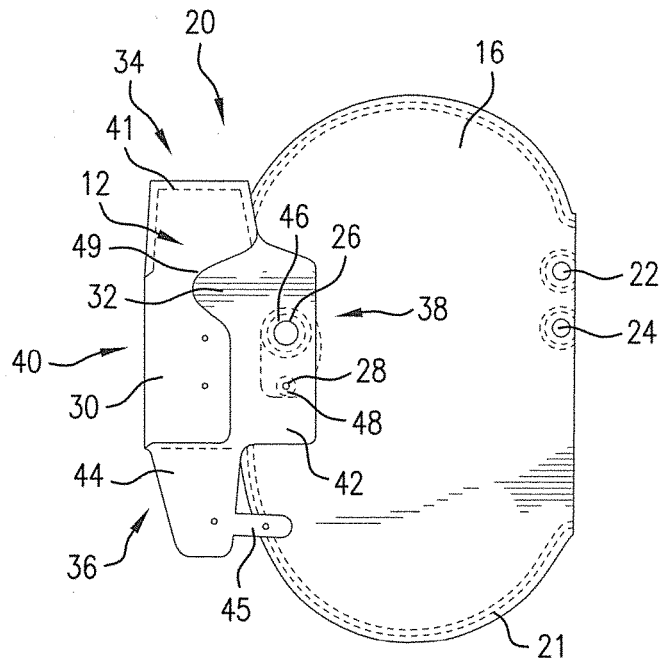
FIG. 3 is a top view of a cover and side airbag cushion combination in a laid out format in accordance with one aspect of the present development.

Turning to FIG. 3, there is shown the cover 12 and the side airbag cushion 16 forming a combination 20 in a laid out format in accordance with one aspect of the present development. The airbag cushion and the cover can be made of any suitable materials. For example, the cushion can be made or constructed of nylon 66 or the like or equivalent. The cover or wrapper can be made or constructed of polyester or the like or equivalent.

In the illustrated laid out format, the side airbag cushion 16 is laid out in an initially flattened and unfolded form. The airbag cushion 16 can be of any suitable form. For example, the airbag cushion may be formed or include an airbag cushion main panel that is folded, e.g., folded in half or other selected folded form, and appropriately joined about its periphery by or with a sewn seam 21 such that the airbag cushion, upon appropriate inflation, expands to form an impact absorbing cushion. As will be appreciated, airbag cushions of various designs and constructions can be utilized in the practice of the subject development and thus the broader practice of the subject development is not necessarily limited by or to airbag cushions of specific or particular form or construction. For example, if desired, airbag cushions of multiple piece construction such as including front and back cushion panels such as joined or connected by one or more sewn seams can be used.

The airbag cushion 16 can desirably include or have one or more exhaust vent openings 22 and 24 such as to allow inflation gas to be appropriately released or vented from the airbag cushion during operation, such as is generally known in the art. The airbag cushion 16 can further desirably include or have one or more inflator device-related openings 26 (larger) and 28 (smaller). For example, the inflator device can be inserted into the cushion through the opening 26 and a stud or the like feature attached to or extending from the inflator device can be passed through the opening 28 such as to serve to attach the cushion onto the inflator device.

In the illustrated laid out format, the cover 12 is in an inverted form and, as shown, may desirably include one or more walls such as a front panel 30 and rear or back panel 32. The cover 12 forms or includes generally opposed first and second ends 34 and 36 and generally opposed first and second sides 38 and 40, with the front panel 30 and rear panel joined or connected together such as by a sewn seam 41 along the first end 34 and extending from the first end at least partially along the first and second sides 38 and 40.

The rear panel 32 forms or includes a side closure flap 42 such as disposed or located at the first side 38, a bottom closure flap 44 such as disposed or located at the second end 36 and a wrapper tab 45, such as extending from the first side 38 of the bottom closure flap 44. The side closure flap 42 desirably forms or includes one or more inflator device-related openings 46 (larger) and 48 (smaller), such as coincide with associated inflator device-related openings 26 and 28 in the airbag cushion 16.

As shown, the front panel 30 may include an attachment notch 49 or the like such as to facilitate subsequent attachment or connection of an inflator device contained within the cover 12.

Those skilled in the art and guided by the teachings herein provided will understand and appreciate that covers, wraps or housings of various design, form and construction can be used in the practice of the subject development and thus the broader practice of the subject development is not necessarily limited by or to the design, form or construction of the cover element utilized in a particular application of the development.

Figures 4, 5:
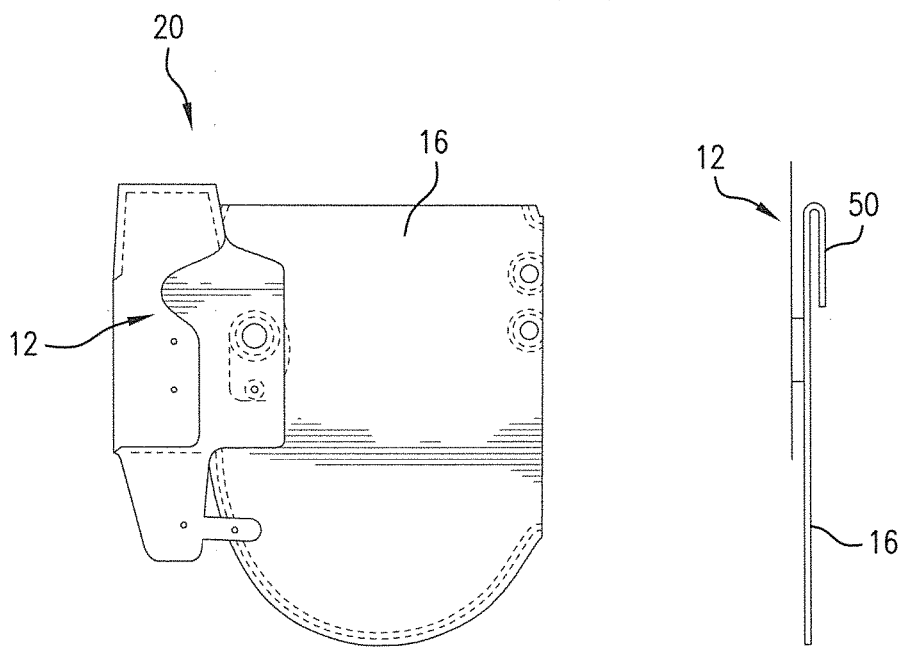
FIG. 4 is a top view of the cover and side airbag cushion combination shown in FIG. 3 with a top section of the airbag cushion folded over.
FIG. 5 is a simplified side sectional view of the cover and cushion combination shown in FIG. 4.

Turning to FIGS. 4 and 5, the cover and side airbag cushion combination 20 shown in FIG. 3 and composed of the cover 12 and the side airbag cushion 16 is now shown with a top section 50 of the airbag cushion 16 now appropriately folded over.

Figure 6:
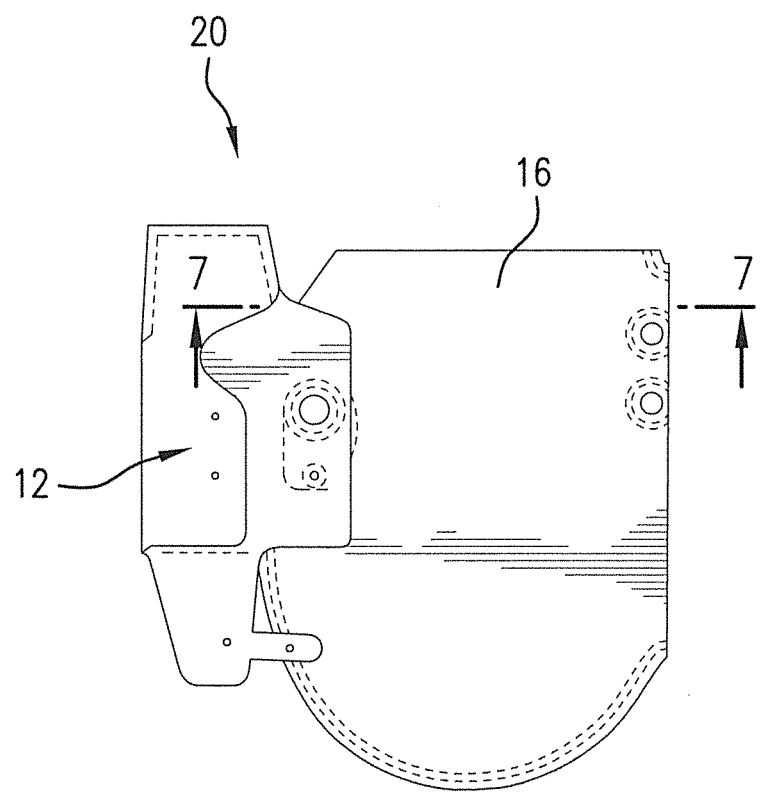
FIG. 6 is a top view of the cover and side airbag cushion combination shown in FIG. 4 with the top left corner of the airbag cushion being further folded.
Figure 7:
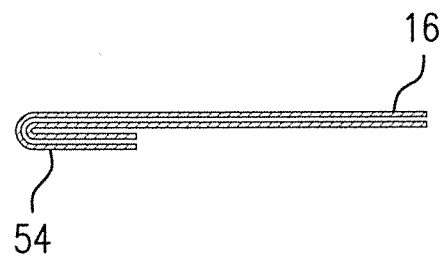
FIG. 7 is a simplified side sectional view of the cover and cushion combination shown in FIG. 6 taken along the line 7-7 shown in FIG. 6.

FIGS. 6 and 7 shows the cover and side airbag cushion combination shown 20 in FIG. 4 and composed of the cover 12 and the side airbag cushion 16 but now with the top left corner 54 of the airbag cushion 16 being further folded such as to facilitate subsequent stowing of the airbag cushion within the cover.

Figure 8:
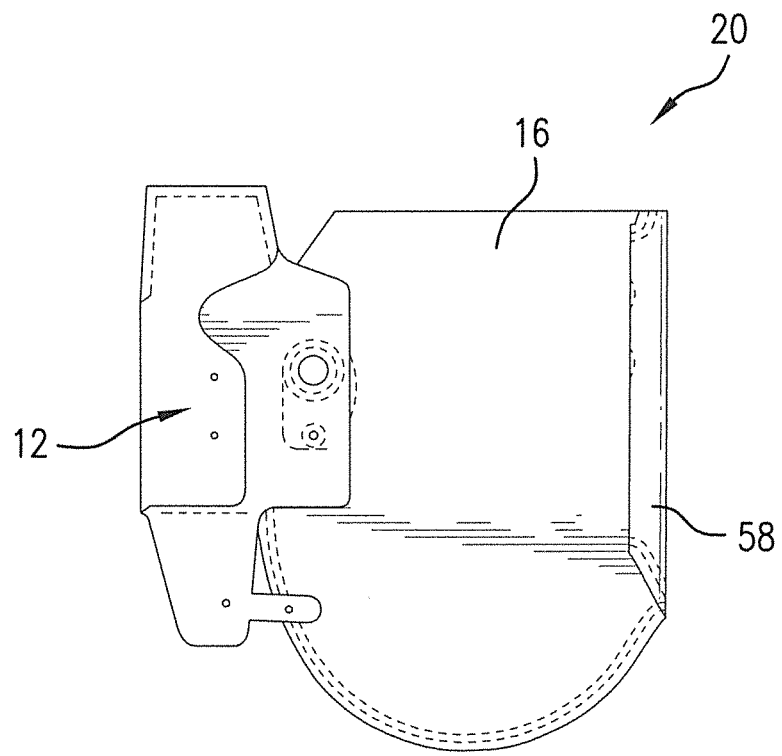
FIG. 8 is a top view of the cover and side airbag cushion combination shown in FIG. 6 with a first main portion of the airbag cushion in a partially rolled configuration.
Figure 9:
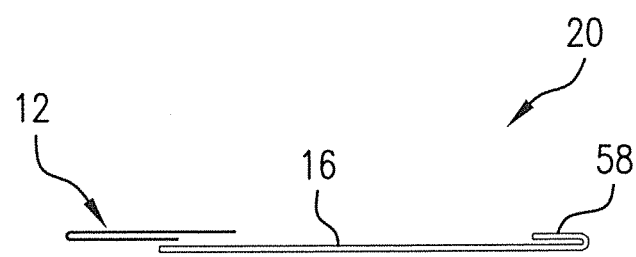
FIG. 9 is a simplified side sectional view of the cover and cushion combination shown in FIG. 8.

FIGS. 8 and 9 show the cover and side airbag cushion combination 20 shown in FIG. 6 and composed of the cover 12 and the side airbag cushion 16 but now with the free end 58 of the airbag cushion 16 (i.e., the end of the airbag opposite from the end attached to the cover) being rolled from the front to the back.

Figure 10:
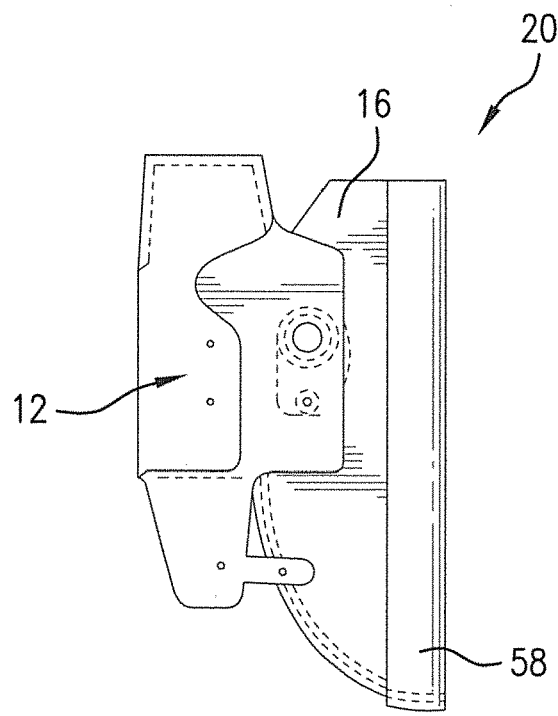
FIG. 10 is a top view of the cover and side airbag cushion combination shown in FIG. 8 with the first main portion of the airbag cushion in a further partially rolled configuration.
Figure 11:
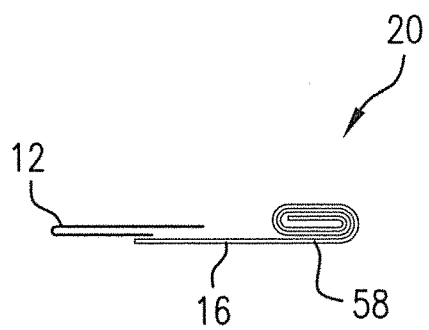
FIG. 11 is a simplified side sectional view of the cover and cushion combination shown in FIG. 10.

FIGS. 10 and 11 show the cover and side airbag cushion combination 20 shown in FIGS. 8 and 9 and composed of the cover 12 and the side airbag cushion 16 but now with the free end 58 of the airbag cushion 16 being further rolled from the front to the back such as to form four 180° inboard rolls. As will be appreciated by those skilled in the art and guided by the teachings herein provided that, the number of complete or partial such rolls can be appropriately altered to meet the needs of specific or particular applications employing such a folded or stowed assembly.

Figure 12:
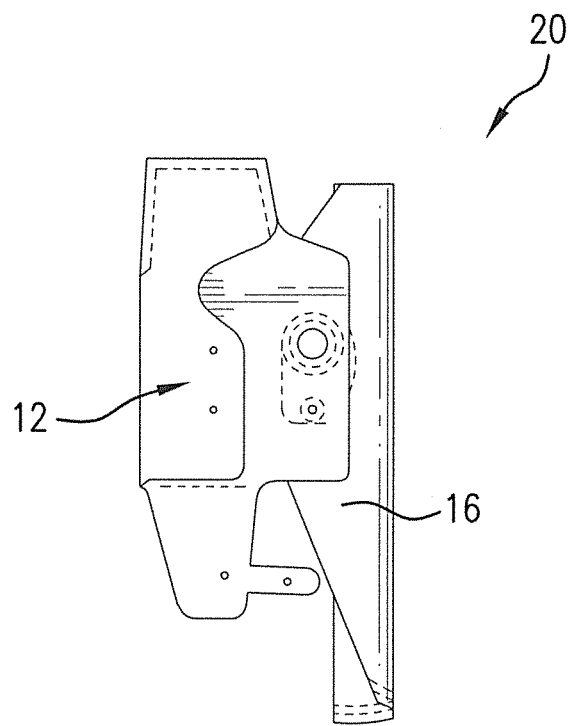
FIG. 12 is a top view of the cover and side airbag cushion combination shown in FIG. 10 with the first main portion of the airbag cushion in a further partially rolled configuration and with the further partially rolled airbag cushion oppositely displaced.
Figure 13:
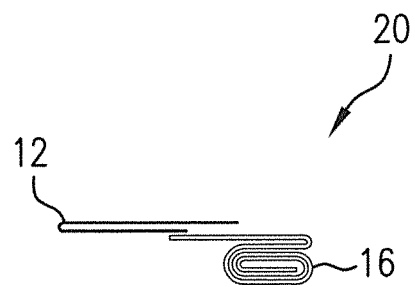
FIG. 13 is a simplified side sectional view of the cover and cushion combination shown in FIG. 12.

FIGS. 12 and 13 show the cover and side airbag cushion combination 20 shown in FIGS. 10 and 11 and composed of the cover 12 and the side airbag cushion 16 with the folding proceeding via a further 180° outboard roll.

Figure 14:
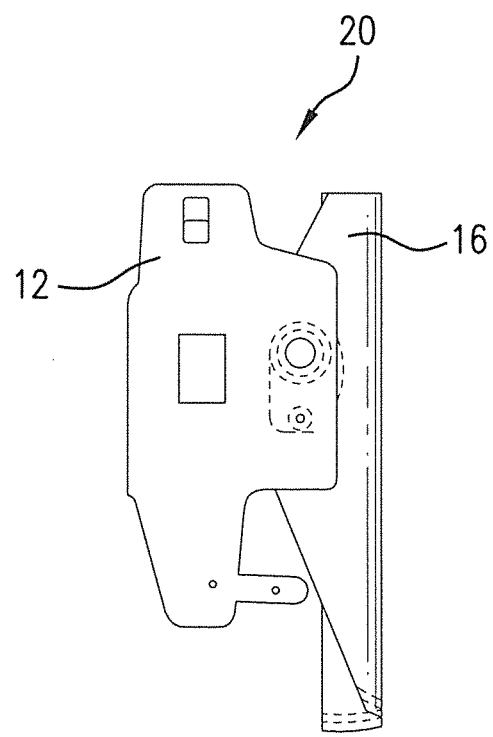
FIG. 14 is a top view of the cover and side airbag cushion combination shown in FIG. 12 but with the cover now inverted.

FIG. 14 shows the cover and side airbag cushion combination 20 shown in FIGS. 12 and 13 and composed of the cover 12 and the side airbag cushion 16 but now with the cover 12 inverted to its operational form and such as to present a clean appearance.

Figure 15:
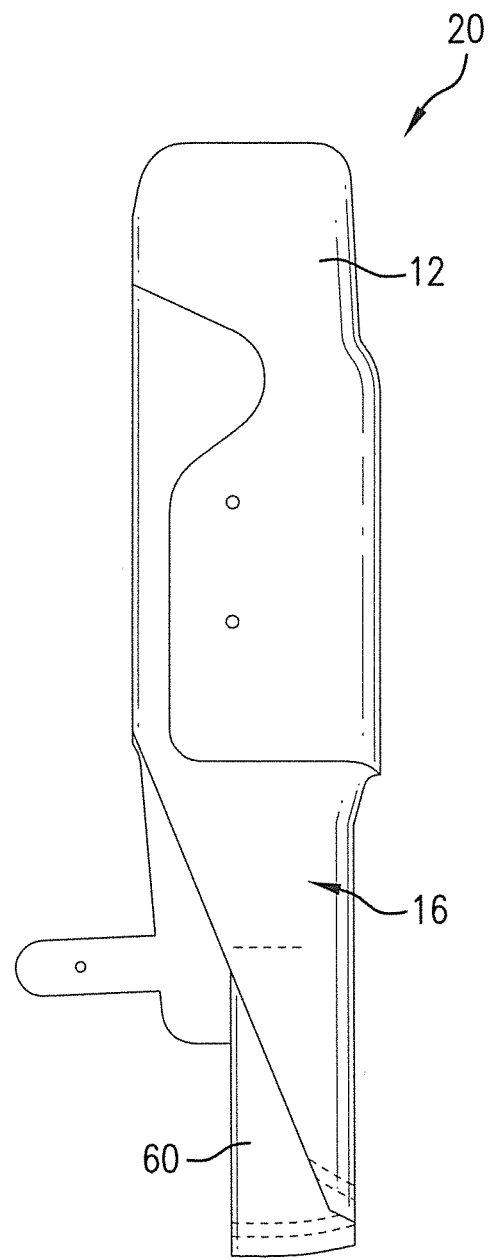
FIG. 15 is a top view of the cover and side airbag cushion combination shown in FIG. 14 but now with the main portion of the airbag cushion inserted into the cover.

FIG. 15 shows the cover and side airbag cushion combination 20 shown in FIG. 14 and composed of the cover 12 and the side airbag cushion 16 but now with rolled top or upper portion of the airbag cushion 16 appropriately stowed within the pocket 18 formed between the front and rear panels 30 and 32 of the cover 12, such as shown in FIG. 2.

As will be appreciated, the so stowed rolled portion of the folded inflatable side airbag cushion is stowed laterally adjacent, that is generally laterally side-by-side, the associated inflator device.

As shown in FIG. 15, the partially stowed airbag cushion 16 includes a distal portion 60 such as extends from the rolled top or upper portion of the airbag cushion 16.

FIGS. 16-20 are simplified schematic side views of the cover and side airbag cushion combination 20 such as shown in FIG. 15 and composed of the cover 12 and the side airbag cushion 16, and also showing the cover 12 containing the associated inflator device 14 and further showing the sequential accordion folding of a distal portion 60 of the airbag cushion 16 in accordance with one aspect of the subject development.

Figure 16:
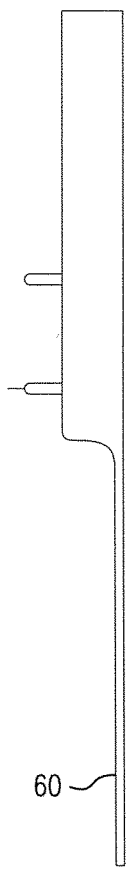
FIGS. 16-20 are simplified schematic side views of a cover and side airbag cushion combination such as shown in FIG. 15, and also showing the cover containing the associated inflator device and further showing the sequential accordion folding of the distal portion of the airbag cushion in accordance with one aspect of the subject development.

More specifically, FIG. 16 shows the airbag cushion distal portion 60 axially extending, in a manner similar to that shown in FIG. 15.

Figure 17:
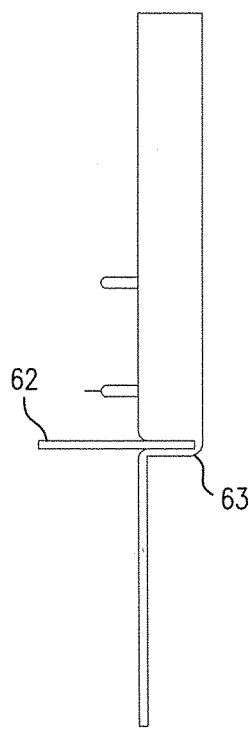

FIG. 17 illustrates the application of a first folding blade 62 such as to create a first fold 63 in the accordion folding of the airbag cushion distal portion 60.

Figure 18:
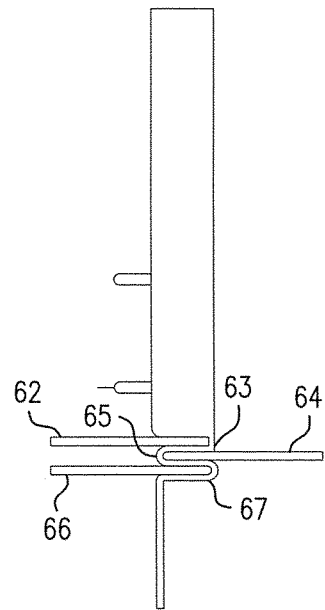
Figure 19:
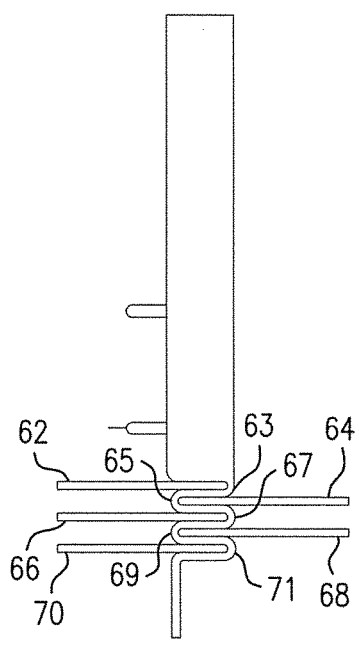
Figure 20:
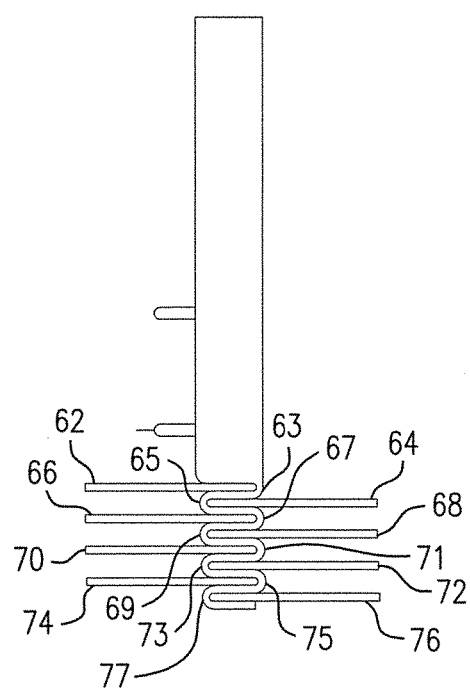

FIGS. 18-20 illustrate the subsequent sequential addition of further folding blades 64, 66, 68, 70, 72, 74, and 76 and the subsequent sequentially formed accordion folds 65, 67, 69, 71, 73, 75 and 77.

As will be appreciated, suitable accordion folds can generally constitute simple zigzag or back and forth folds wherein two adjacent folds go in opposite directions such as to form or represent pleats such as resembling the bellows of an accordion.

While the length between adjacent folds can desirably be generally uniform, such as to provide or result in a more uniform appearance, the broader practice of the invention is not necessarily so limited as accordion folds with dissimilar lengths between adjacent folds are also herein encompassed.

Figure 21:
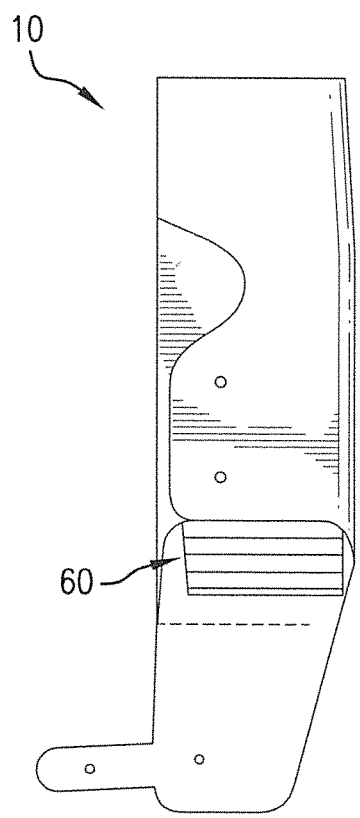
FIG. 21 is a top view of the cover and side airbag cushion combination shown in FIG. 15 and now further showing the distal portion of the airbag cushion also inserted into the cover.

FIG. 21 shows the cover and side airbag cushion combination shown in FIG. 15 but now further showing the accordion folded distal portion 60 of the airbag cushion 16, such as resulting from the processing shown in FIGS. 16-20, also inserted into the cover 12.

Figure 22:
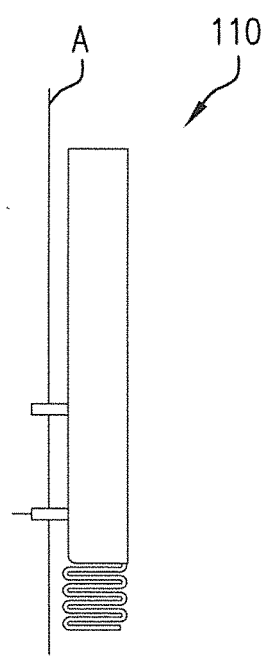
FIG. 22 is a side view of a side airbag assembly, in accordance with one aspect of the subject development, and as applied to an application surface.

FIG. 22 illustrates a side view of a side airbag assembly 110, in accordance with one aspect of the subject development, and as applied to an application surface A, such as a seat frame or other suitable surface for attachment of an airbag module in a vehicle.

As shown, the side airbag assembly 110 can provide or results in a desirably narrow or slim side profile such as can be particularly suited for inclusion in modern automotive vehicle designs and such as generally desired by automotive manufactures and designers. For example, side airbag installations for an associated vehicle passenger may typically involve inclusion or incorporation of an airbag module or assembly within the seat of the passenger. Thin airbag modules and assemblies such as generally formed by or through the practice of the subject development permit or facilitate inclusion or incorporation of the side airbag module or assembly within the vehicle interior, e.g., the passenger seat, while allowing or permitting that the seat styling remain sleek and/or thin as generally desired for greater vehicle design flexibility.

FIG. 23-25 illustrate the cover 12 containing the inflator device 14 and the side airbag cushion 16 with a first rolled main portion and a second accordion folded distal portion of the cushion appropriately housed or stowed within the cover 12.

The bottom closure flap 44 is attached around the folded cushion and attached to inflator studs extending from the inflator device 14 such as in a manner known in the art and such as to hold the folded airbag cushion in place and maintain vehicle design packaging requirements.

Returning to FIGS. 1 and 2, the wire harness 80 associated with the inflator device 14 is appropriately positioned and the wrapper tab 45 is attached around the wire harness 80 to appropriately hold the harness in place.

While the broader practice of the subject development is not necessarily dimensionally limited, in accordance with one aspect of the subject development it is has been found generally desired that at least 10% of the cushion volume be in the form of accordion fold(s) such as herein described. In accordance with another aspect of the subject development it is has been found generally desired that no more than 65% of the cushion volume be in the form of accordion fold(s) such as herein described.

In accordance with certain preferred embodiments, it is has been found generally desired that at least 30% of the cushion volume be in the form of accordion fold(s) such as herein described.

In accordance with certain preferred embodiments, it is has been found generally desired that no more than 55% of the cushion volume be in the form of accordion fold(s) such as herein described.

In accordance with certain particularly preferred embodiments, it is has been found generally desired that at least 40% of the cushion volume be in the form of accordion fold(s) such as herein described.

In accordance with certain particularly preferred embodiments, it is has been found generally desired that no more than 50% of the cushion volume be in the form of accordion fold(s) such as herein described.

In one particular embodiment, about 45% of the cushion volume is desirably in the form of accordion fold(s) such as herein described. For example, for an airbag cushion having an inflated volume of 20 liters, about 8.9 liters of the airbag cushion volume is desirably in the form of accordion folds such as herein described.

In airbag assembly in accordance with one aspect of the subject development, the side airbag cushion is in inflation gas flow communication with the inflator device upon actuation of the inflator device with the side airbag cushion at least in part disposed within the cover cavity in a stowed configuration. In such a stowed configuration, airbag cushion includes a first rolled main portion and a second accordion folded distal portion, and wherein, upon deployment, inflation gas into or in the airbag cushion must sequentially flow through the cushion main portion prior to passage into the cushion distal portion.

Figure 26:
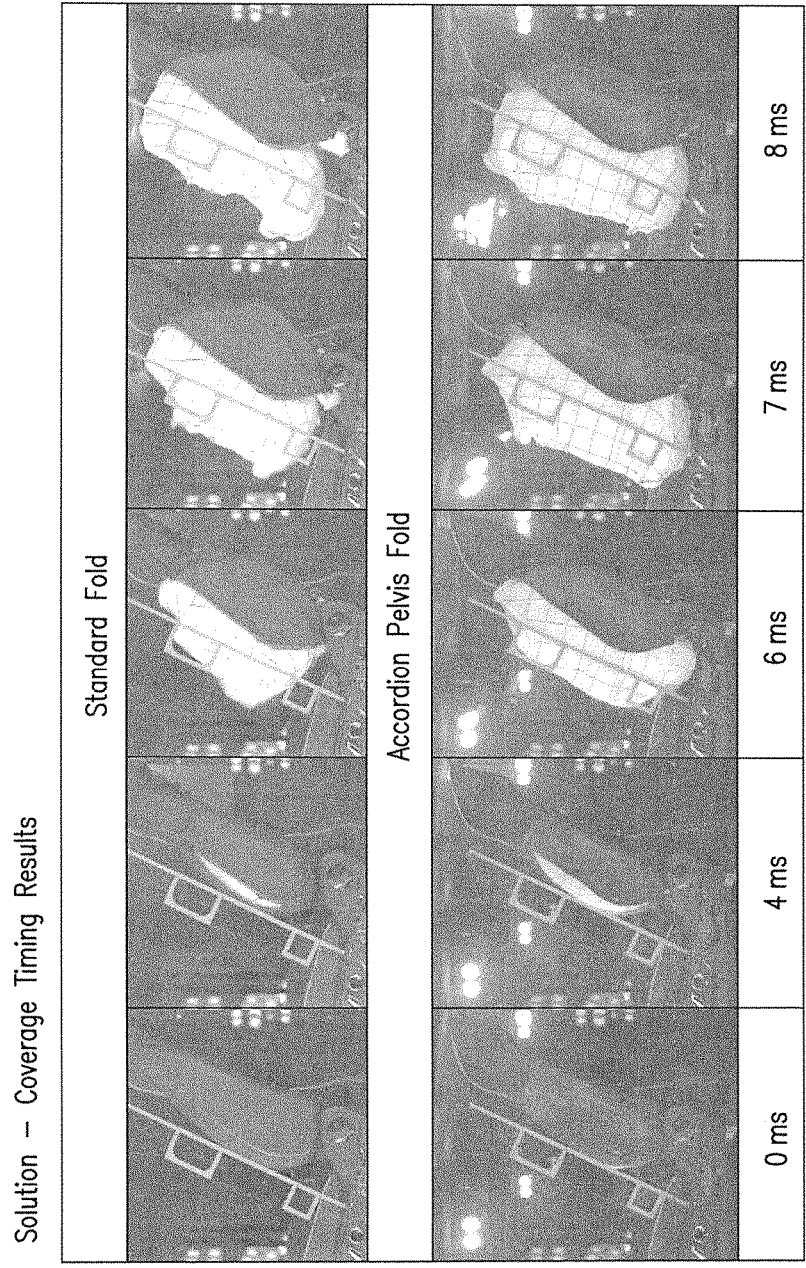
FIG. 26 is a time view comparison of the deployment of standard folded side airbag cushion and a side airbag with an accordion folded distal pelvis portion in accordance with an embodiment and an aspect of the subject development.

FIG. 26 is a time view comparison of the deployment of standard folded side airbag cushion and a side airbag with an accordion folded distal pelvis portion in accordance with an embodiment and an aspect of the subject development.

As shown, the side airbag cushion with an accordion folded distal pelvis portion in accordance with an embodiment and an aspect of the subject development provided or resulted in very good coverage timing results.

In accordance with one aspect of the subject development, in a side airbag assembly wherein an inflator device, upon actuation, provides inflation gas to inflate an associated side airbag cushion, a method for stowing the side airbag cushion in a cover to provide, upon deployment, improved timing such as to allow, permit or result in better or improved pelvis coverage for an associated vehicle passenger is provided. In one embodiment, such a method involves coupling the inflator device with the cover. The inflator device is coupled with the side airbag cushion in inflation gas flow communication via an inlet opening in a proximal main portion of the side airbag cushion. The side airbag cushion includes a distal portion extending from the proximal main portion. The proximal main portion of the side airbag cushion is rolled to form a first rolled main portion. The distal portion of the side airbag cushion is appropriately folded, i.e., accordion folded to form a second accordion folded distal portion. In accordance with one preferred embodiment and as discussed above, upon deployment, inflation gas into or in the side airbag cushion must sequentially flow through the proximal main portion of the side airbag cushion prior to passage into the accordion folded distal portion.

Accordion folding of a side airbag cushion, such as herein described, desirably results, produces or forms a shape or packaging that is desirably thin such as to meet automotive manufacture vehicle design needs and expectations while simultaneously or concurrently providing or resulting in an airbag cushion and associated assembly that provides or produces very good deployment coverage and timing.

Thus in accordance with at least a preferred aspect of the subject development, accordion folding of a side airbag cushion, such as herein described, desirably solves design needs for a side airbag cushion and associated assembly that appropriately deploys the airbag cushion into an increasingly narrowing design gap or spacing between a vehicle occupant and the vehicle side door or panel while also satisfying increasingly demanding sacroiliac force limitations imposed on side airbag cushions and associated assemblies.

Those skilled in the art and guided by the teachings herein provided will understand and appreciate that folded inflatable side airbag cushions, such as herein described and side airbag assemblies incorporating or utilizing such folded inflatable side airbag cushions as well as associated methods can desirably serve to assist in satisfaction of new, more stringent, side impact crashworthiness requirements as well as result in enhanced performance when, for example, used or tested using anthropomorphic test devices (ATD) such as the WorldSID ATD which has or exhibits a generally wider pelvis region than the current ES-2re ATD used for USN-CAP testing.

Consequently, such a change in ATD can act to reduce the dimensions of the gap or space between the test device (particularly in the vicinity of the pelvic area or region) and the door liner. As a result, the inflatable airbag cushion may have less time to expand into the volume between the pelvis and door liner due to the wider pelvis of new test devices.

Thus, the subject development can desirably provide or result in the satisfaction of increasingly stringent performance criteria for vehicle side impact safety restraints while simultaneously providing thin and sleek safety restraint assembly or module designs such as typically desired by automobile manufacturers and designers presents ongoing challenges to those in the industry.

The claims are not intended to include, and should not be interpreted to include, means-plus- or step-plus-function limitations, unless such a limitation is explicitly recited in a given claim using the phrase(s) "means for" or "step for," respectively.

The subject development illustratively disclosed herein suitably may be practiced in the absence of any element, part, step, component, or ingredient which is not specifically disclosed herein.

While in the foregoing detailed description this development has been described in relation to certain preferred embodiments thereof, and many details have been set forth for purposes of illustration, it will be apparent to those skilled in the art that the development is susceptible to additional embodiments and that certain of the details described herein can be varied considerably without departing from the basic principles of the invention.

What is claimed is:

1. A folded inflatable side airbag cushion for providing improved timing of pelvis coverage for an associated vehicle passenger, said folded inflatable side airbag cushion comprising:
    a first rolled portion; and
    a second accordion folded portion;
    wherein, upon deployment, the accordion folded portion provides pelvis coverage for the associated vehicle passenger.

2. The folded inflatable side airbag cushion of claim 1 wherein:
    the first rolled portion comprises a first main portion of the side airbag cushion; and
    the second accordion folded portion comprises a distal portion of the side airbag cushion, the distal portion extending from the first main portion of the side airbag cushion, wherein inflation gas in side airbag cushion must sequentially flow through the first main portion prior to passage into the distal portion.

3. The folded inflatable side airbag cushion of claim 1 wherein upon inflation the side airbag cushion has a total inflation volume and wherein in folded form the second accordion folded portion comprises 10%-65% of the total inflation volume of the side airbag cushion upon inflation.

4. The folded inflatable side airbag cushion of claim 1 wherein upon inflation the side airbag cushion has a total inflation volume and wherein in folded form the second accordion folded portion comprises 30%-55% of the total inflation volume of the side airbag cushion upon inflation.

5. The folded inflatable side airbag cushion of claim 1 wherein upon inflation the side airbag cushion has a total inflation volume and wherein in folded form the second accordion folded portion comprises 40%-50% of the total inflation volume of the side airbag cushion upon inflation.

6. A combination forming a side airbag assembly, the combination comprising:
    the folded inflatable side airbag cushion of claim 1;
    a cover comprising a wall defining at least a portion of a cavity; and
    an inflator device at least in part disposed within the cover cavity, the inflator device in inflation gas flow communication with the folded inflatable side airbag cushion, and with the inflator device, upon actuation, providing inflation gas to inflate the folded inflatable side airbag cushion.

7. The combination of claim 6 wherein the first rolled portion of the folded inflatable side airbag cushion is stowed laterally adjacent the inflator device.

8. The combination of claim 7 wherein the second accordion folded portion of the folded inflatable side airbag cushion is stowed vertically adjacent the inflator device.

9. A side airbag assembly comprising:
    a cover comprising a wall defining at least a portion of a cavity;
    an inflator device at least in part disposed within the cover cavity, the inflator device, upon actuation, providing inflation gas; and
    a side airbag cushion, the side airbag cushion in inflation gas flow communication with the inflator device upon actuation of the inflator device, the side airbag cushion at least in part disposed within the cover cavity in a stowed configuration, wherein the stowed configuration of the airbag cushion includes a first rolled main portion and a second accordion folded distal portion, and wherein, upon deployment, inflation gas in the airbag cushion must sequentially flow through the cushion main portion prior to passage into the cushion distal portion.

10. The side airbag assembly of claim 9 wherein upon inflation the side airbag cushion has a total inflation volume and wherein the second accordion folded distal portion comprises 10%-65% of the total inflation volume of the side airbag cushion upon inflation.

11. The side airbag assembly of claim 9 wherein upon inflation the side airbag cushion has a total inflation volume and wherein the second accordion folded distal portion comprises 30%-55% of the total inflation volume of the side airbag cushion upon inflation.

12. The side airbag assembly of claim 9 wherein upon inflation the side airbag cushion has a total inflation volume and wherein the second accordion folded distal portion comprises 40%-50% of the total inflation volume of the side airbag cushion upon inflation.

13. The side airbag assembly of claim 9 wherein the first rolled main portion of the side airbag cushion is stowed laterally adjacent the inflator device.

14. The side airbag assembly of claim 13 wherein the second accordion folded distal portion of the side airbag cushion is stowed vertically adjacent the inflator device.

15. In a side airbag assembly including wherein an inflator device, upon actuation, provides inflation gas to inflate an associated side airbag cushion, a method for stowing the side airbag cushion in a cover to provide, upon deployment, improved timing of pelvis coverage for an associated vehicle passenger, the method comprising:
    coupling the inflator device with the cover;
    coupling the inflator device with the side airbag cushion in inflation gas flow communication in a proximal main portion of the side airbag cushion, the side airbag cushion including a distal portion extending from the proximal main portion;
    rolling the proximal main portion of the side airbag cushion to form a first rolled main portion; and
    folding the distal portion of the side airbag cushion to form a second accordion folded distal portion;

wherein, upon deployment, inflation gas in the side airbag cushion must sequentially flow through the proximal main portion of the side airbag cushion prior to passage into the accordion folded distal portion.

16. The method of claim 15 wherein upon inflation the side airbag cushion has a total inflation volume and wherein the second accordion folded distal portion comprises 10%-65% of the total inflation volume of the side airbag cushion upon inflation.

17. The method of claim 15 wherein upon inflation the side airbag cushion has a total inflation volume and wherein the second accordion folded distal portion comprises 30%-55% of the total inflation volume of the side airbag cushion upon inflation.

18. The method of claim 15 wherein upon inflation the side airbag cushion has a total inflation volume and wherein the second accordion folded distal portion comprises 40%-50% of the total inflation volume of the side airbag cushion upon inflation.

* * * * *